US008527090B2

(12) United States Patent
Monto et al.

(10) Patent No.: US 8,527,090 B2

(45) Date of Patent: Sep. 3, 2013

(54) METHOD, COMPUTER PROGRAM PRODUCT AND APPARATUS FOR FACILITATING STORAGE AND/OR RETRIEVAL OF UNIT DOSE MEDICATIONS

(75) Inventors: David Monto, McKees Rocks, PA (US); Ben Tylenda, Venetia, PA (US); Anandhi Sarangan, Crescent, PA (US); Mark Leng, Venetia, PA (US); Shawn Greyshock, Tarentum, PA (US)

(73) Assignee: McKesson Automation Inc., Cranberry, PA (US)

( * ) Notice: Subject to any disclaimer, the term of this patent is extended or adjusted under 35 U.S.C. 154(b) by 344 days.

(21) Appl. No.: 12/750,133

(22) Filed: Mar. 30, 2010

(65) Prior Publication Data

US 2011/0245969 A1 Oct. 6, 2011

(51) Int. Cl.
*G06F 17/00* (2006.01)

(52) U.S. Cl.
USPC ............................ 700/242; 700/236; 700/240

(58) Field of Classification Search
USPC ............... 221/122; 700/57, 58, 59, 192, 236, 700/240, 242, 243
See application file for complete search history.

(56) References Cited

U.S. PATENT DOCUMENTS 4,717,042 A 1/1988 McLaughlin
4,785,969 A 11/1988 McLaughlin
4,847,764 A 7/1989 Halvorson
5,014,875 A 5/1991 McLaughlin et al.
5,190,185 A 3/1993 Blechl
5,314,243 A 5/1994 McDonald et al.
5,346,297 A 9/1994 Colson, Jr. et al.
5,377,864 A 1/1995 Blechl et al.
5,405,048 A 4/1995 Rogers et al.
5,431,299 A 7/1995 Brewer et al.
5,460,294 A 10/1995 Williams
5,468,110 A 11/1995 McDonald et al.
5,480,062 A 1/1996 Rogers et al.
5,520,450 A 5/1996 Colson, Jr. et al.
5,564,803 A 10/1996 McDonald et al.
5,593,267 A 1/1997 McDonald et al.
5,661,978 A 9/1997 Holmes et al.
D384,578 S 10/1997 Wangu et al.
5,713,485 A 2/1998 Liff et al.
5,716,114 A 2/1998 Holmes et al.
5,745,366 A 4/1998 Higham et al.
5,761,877 A 6/1998 Quandt
5,797,515 A 8/1998 Liff et al.
5,805,456 A 9/1998 Higham et al.
5,842,976 A 12/1998 Williamson
5,878,885 A 3/1999 Wangu et al.
5,880,443 A 3/1999 McDonald et al.
5,883,806 A 3/1999 Meador et al.
5,893,697 A 4/1999 Zini et al.
5,905,653 A 5/1999 Higham et al.
5,912,818 A 6/1999 McGrady et al.
5,927,540 A 7/1999 Godlewski
5,940,306 A 8/1999 Gardner et al.
5,971,593 A 10/1999 McGrady (Continued)

*Primary Examiner* — Timothy Waggoner

(74) *Attorney, Agent, or Firm* — Alston & Bird LLP

(57) ABSTRACT

A method for facilitating storage and/or retrieval of unit dose medications may include receiving an indication that a medication receptacle is positioned proximate to an alignment pin, determining a position of the alignment pin relative to an alignment guide disposed in the medication receptacle, and providing an output indicative of an alignment state of the medication receptacle based on the position determined. A corresponding computer program product and apparatus is also provided.

24 Claims, 13 Drawing Sheets

(56) References Cited

U.S. PATENT DOCUMENTS

| | | | |
|---|---|---|---|
| 6,003,006 A | 12/1999 | Colella et al. | |
| 6,011,999 A | 1/2000 | Holmes | |
| 6,021,392 A | 2/2000 | Lester et al. | |
| 6,039,467 A | 3/2000 | Holmes | |
| 6,065,819 A | 5/2000 | Holmes et al. | |
| 6,068,156 A | 5/2000 | Liff et al. | |
| 6,109,774 A | 8/2000 | Holmes et al. | |
| 6,112,502 A | 9/2000 | Frederick et al. | |
| 6,116,461 A | 9/2000 | Broadfield et al. | |
| 6,151,536 A | 11/2000 | Arnold et al. | |
| 6,170,230 B1 | 1/2001 | Chudy et al. | |
| 6,176,392 B1 | 1/2001 | William et al. | |
| 6,189,727 B1 | 2/2001 | Shoenfeld | |
| 6,223,934 B1 | 5/2001 | Shoenfeld | |
| 6,256,967 B1 | 7/2001 | Hebron et al. | |
| 6,283,322 B1 | 9/2001 | Liff et al. | |
| 6,289,656 B1 | 9/2001 | Wangu et al. | |
| 6,338,007 B1 | 1/2002 | Broadfield et al. | |
| 6,339,732 B1 | 1/2002 | Phoon et al. | |
| 6,361,263 B1 | 3/2002 | Dewey et al. | |
| 6,370,841 B1 | 4/2002 | Chudy et al. | |
| 6,449,927 B2 | 9/2002 | Hebron et al. | |
| 6,471,089 B2 | 10/2002 | Liff et al. | |
| 6,497,342 B2 | 12/2002 | Zhang et al. | |
| 6,499,270 B2 | 12/2002 | Peroni et al. | |
| 6,532,399 B2 | 3/2003 | Mase | |
| 6,564,121 B1 | 5/2003 | Wallace et al. | |
| 6,581,798 B2 | 6/2003 | Liff et al. | |
| 6,609,047 B1 | 8/2003 | Lipps | |
| 6,611,733 B1 | 8/2003 | De La Huerga | |
| 6,625,952 B1 | 9/2003 | Chudy et al. | |
| 6,640,159 B2 | 10/2003 | Holmes et al. | |
| 6,650,964 B2 | 11/2003 | Spano, Jr. et al. | |
| 6,671,579 B2 | 12/2003 | Spano, Jr. et al. | |
| 6,681,149 B2 | 1/2004 | William et al. | |
| 6,742,671 B2 | 6/2004 | Hebron et al. | |
| 6,755,931 B2 | 6/2004 | Vollm et al. | |
| 6,760,643 B2 | 7/2004 | Lipps | |
| 6,776,304 B2 | 8/2004 | Liff et al. | |
| 6,785,589 B2 | 8/2004 | Eggenberger et al. | |
| 6,790,198 B1 | 9/2004 | White et al. | |
| 6,814,254 B2 | 11/2004 | Liff et al. | |
| 6,814,255 B2 | 11/2004 | Liff et al. | |
| 6,847,861 B2 | 1/2005 | Wangu et al. | |
| 6,874,684 B1 | 4/2005 | Denenberg et al. | |
| 6,892,780 B2 | 5/2005 | Vollm et al. | |
| 6,895,304 B2 | 5/2005 | Spano, Jr. et al. | |
| 6,975,922 B2 | 12/2005 | Duncan et al. | |
| 6,985,797 B2 | 1/2006 | Spano, Jr. et al. | |
| 6,996,455 B2 | 2/2006 | Eggenberger et al. | |
| 7,010,389 B2 | 3/2006 | Lunak et al. | |
| 7,014,063 B2 | 3/2006 | Shows et al. | |
| 7,016,766 B2 | 3/2006 | William et al. | |
| 7,040,504 B2 | 5/2006 | Broadfield et al. | |
| 7,052,097 B2 | 5/2006 | Meek, Jr. et al. | |
| 7,072,737 B2 | 7/2006 | Lunak et al. | |
| 7,072,855 B1 | 7/2006 | Godlewski et al. | |
| 7,077,286 B2 | 7/2006 | Shows et al. | |
| 7,085,621 B2 | 8/2006 | Spano, Jr. et al. | |
| 7,086,560 B2 * | 8/2006 | Shioya | 221/191 |
| 7,092,796 B2 | 8/2006 | Vanderveen | |
| 7,093,755 B2 | 8/2006 | Jordan et al. | |
| 7,100,792 B2 | 9/2006 | Hunter et al. | |
| 7,103,419 B2 | 9/2006 | Engleson et al. | |
| 7,111,780 B2 | 9/2006 | Broussard et al. | |
| 7,139,639 B2 | 11/2006 | Broussard et al. | |
| 7,150,724 B2 | 12/2006 | Morris et al. | |
| 7,159,740 B2 * | 1/2007 | Nanthakumar et al. | 700/266 |
| 7,171,277 B2 | 1/2007 | Engleson et al. | |
| 7,218,231 B2 | 5/2007 | Higham | |
| 7,228,198 B2 * | 6/2007 | Vollm et al. | 700/228 |
| 7,249,688 B2 | 7/2007 | Hunter et al. | |
| 7,348,884 B2 | 3/2008 | Higham | |
| 7,417,729 B2 | 8/2008 | Greenwald | |
| 7,419,133 B2 | 9/2008 | Clarke et al. | |
| 7,426,425 B2 | 9/2008 | Meek, Jr. et al. | |
| 7,554,449 B2 | 6/2009 | Higham | |
| 7,571,024 B2 | 8/2009 | Duncan et al. | |
| 7,588,167 B2 | 9/2009 | Hunter et al. | |
| 7,748,628 B2 | 7/2010 | Greyshock | |
| 8,027,748 B2 * | 9/2011 | Handfield et al. | 700/242 |
| 8,036,773 B2 | 10/2011 | Braun | |
| 8,162,174 B2 * | 4/2012 | Hieb et al. | 221/210 |
| 8,195,329 B2 * | 6/2012 | Pinney et al. | 700/240 |
| 2007/0265730 A1 | 11/2007 | Greyshock | |

* cited by examiner

METHOD, COMPUTER PROGRAM PRODUCT AND APPARATUS FOR FACILITATING STORAGE AND/OR RETRIEVAL OF UNIT DOSE MEDICATIONS

FIELD OF THE INVENTION

Exemplary embodiments of the present invention relate generally to storing and retrieving unit dose medications.

BACKGROUND OF THE INVENTION

In a typical hospital, nursing home, or other similar institution, doctors will visit their patients on a routine basis and prescribe various medications for each patient. In turn, each patient will likely be placed on a certain medication treatment plan that requires that he or she take one or more doses of various medications daily. Some medications may require that they be administered only at certain times of the day (e.g., after meals) and/or at intervals of one or more hours each day. In addition, patients may request certain medications on an elective basis for complaints, such as head or body aches. These requests are typically included with the doctor's medication request or prescription that he or she sends to a pharmacy of the hospital for filling.

Medication requests or prescriptions received by the pharmacy will likely be checked by a registered pharmacist and then entered into the pharmacy information system. These requests reflect not only orders that are added to a particular patient's treatment plan, but also changes in a patient's existing treatment plan. The pharmacy information system combines this information with the patient's existing medication schedule and develops a patient medication profile. Using the patient medication profile, a fill list can be created that lists all medications that must be distributed to all patients for a given time period (e.g., a day).

In some instances, this list is printed and used by a pharmacist or pharmacy technician to hand pick each of the drugs needed for each patient (in the form of unit doses) and place those drugs in corresponding patient-specific medication containers (e.g., drawers, boxes, bins or bags). A registered pharmacist then checks the accuracy of the patient order, and, assuming the order was accurate, the individual patient boxes are loaded into a large transport cart and delivered to a nursing unit.

Several drawbacks exist, however, to this method of medication retrieval and distribution. In particular, it is very time consuming and manpower intensive. As a result, systems were created for automating the process of retrieving unit dose medications and distributing them to patients according to their respective medication profiles. One example of such a system is the ROBOT-Rx® system, offered by McKesson Automation Inc. and described in U.S. Pat. Nos. 5,468,110, 5,593,267 and 5,880,443, and other examples are described in U.S. patent application Ser. Nos. 11/382,605, filed May 10, 2006, 11/611,956, filed Dec. 18, 2006 and 11/755,207, filed May 30, 2007, the contents of which are hereby incorporated herein by reference.

The ROBOT-Rx® system, like other similar systems, is a stationary robotic system that automates the drug storing, dispensing, returning, restocking and crediting process by using barcode technology. In particular, single doses of medications are re-packaged, for example in a clear plastic bag, so that each package contains a barcode corresponding to the package contents. The barcode may include the name of the medication, quantity, weight, instructions for use and/or expiration date.

The packaged medications are then stored in a storage area, such as a storage rack having a frame and a plurality of rod supports on which each package can be hung in a manner that provides each with an X, Y coordinate. Using the X, Y coordinates, packages can then be selected by an automated picking means (e.g., a robotic arm capable of moving at least in three, mutually orthogonal directions designated X, Y and Z), for distribution to individual patients.

More specifically, in one instance, a pharmacist or technician may manually enter the identification of a specific medication he or she would like the automated system to retrieve, for example, as a patient's first dose, in an emergency situation. The automated system, and, in particular, a computer associated with the automated system, would then locate the desired medication (i.e., the X, Y and Z coordinates of the medication) and instruct the picking means to retrieve the medication at that location. In another instance, the fill list created based on each patient's medication profile may be communicated to the computer associated with the automated system, providing the automated system with a current list of all patients and their individual medication needs. The computer also maintains a database of all medications stored in the storage area along with their corresponding X, Y and Z coordinates.

Patient-specific containers (e.g., drawers or bins) displaying barcodes that include the corresponding patient's unique identification code are placed on a conveyer belt associated with the automated system. At one point on the belt, a barcode reader reads the barcode displayed on the patient-specific box or container and communicates the patient's identification to the computer. The computer will then retrieve the patient's medication needs from the fill list, and determine the corresponding coordinates for each medication by accessing the database.

The computer can then guide the picking means to select the desired unit dose medications and deposit them in the patient-specific boxes or containers. In particular, the picking means, which also includes a barcode reader, moves to the designated location of a particular medication, as instructed by the computer, scans the barcode displayed on the package containing the medication to identify the medication contained in the package, and provides the identity to the computer.

After the computer confirms that the correct unit dose medication is contained in the package, the picking means will remove the package from the storage area (e.g., using a vacuum generator to produce suction to pull the package off the rod, or other holding means, and hold the package until it can be deposited) and drop it into the patient-specific container.

The process is repeated until the patient's prescription has been filled (i.e., until the patient-specific medication container contains each dose of medication to be taken by the patient in the given time period or, in the instance where the unit dose retrieved the first dose for a new patient, until that first dose has been retrieved). The conveyor belt then moves the patient-specific container to a check station where an operator can use yet another barcode reader to scan the barcode label on the patient-specific container to retrieve and display the patient's prescription, as well as to scan the barcodes on each package in the container to verify that the medications are correct.

As described above, unit dose medications dispensed robotically may be packaged into bags, boxes or a variety of other over-wraps prior to being stored in the storage area. This repackaging effort is performed for several reasons. First, the size and shape of the raw packages vary greatly; therefore, without some commonality in product shape, robotic handling becomes extremely difficult. Second, while robotic systems typically rely on barcodes to identify the products throughout the process, the majority of products originating from various manufacturers do not contain barcodes of any kind or are inconsistent with respect to the information they provide. Accordingly, in these instances, over-wrapping the unit dose with a package containing a barcode may be accomplished for identification purposes.

More recently, efforts have been made to reduce any need for repackaging since, for example, repackaging adds material costs to the final product and requires both additional technician time to perform the packaging as well as additional pharmacist time to validate the content of the package against the description on the label. In addition, repacking by a hospital, or similar institution, shortens the expiration date of the repackaged item based on United States Pharmacopeia/National Formulary (USP/NF) repackaging standards. Moreover, since efforts are being made to ensure that all human drug products have a barcode on the smallest container or package distributed which, in many instances, is the unit dose medication, each unit dose on a unit dose blister card will have a barcode thereon. This includes all human prescription drug products and over-the-counter drugs that are dispensed pursuant to an order in the hospital. The barcode must contain, at a minimum, a National Drug Code (NDC) in a linear barcode, in the Uniform Code Council (UCC) or Health Industry Business Communications Council (HIBCC) format. Following the effective date of this mandate, assuming that the unit dose medications are the smallest container or package used, all unit dose medications will contain barcodes that can be used by robotic dispensing systems, thus eliminating the need to overwrap or repackage merely for identification purposes.

However, even though improvements may be achieved by enhancing the utility of an automated dispensing system in relation to eliminating repackaging or over-wrapping operations, such systems still require a fair amount of manual intervention to prepare the medications for automated dispensing. Additionally, there is no standard shape or configuration for unit dose blister cards, so automatic dispensing of unit doses was a challenge. This challenge was initially met by U.S. patent application Ser. No. 11/382,605, filed May 10, 2006, which provided a robotic device capable of dispensing unit dose blisters automatically. However, even for an automatic or robotic dispensing system, there may be challenges encountered in relation to ensuring proper alignment of medication packages and/or the containers that facilitate handling of the medication packages. For example, if a medication package or container is not properly aligned, the machinery used for automatic handling and dispensing may not be able to function properly. Accordingly, it may be desirable to provide a mechanism by which to improve automatic operation of robotic dispensing equipment.

BRIEF SUMMARY OF THE INVENTION

In general, exemplary embodiments of the present invention provide improvements relating to, among other things, providing a mechanism by which to perform alignment detection functions with respect to a device used to pick medications during automatic medication handling and dispensing. In this regard, for example, some example embodiments may provide enablement for determining a cause for an alignment failure encountered during handling and/or for automatically learning storage locations.

In particular, according to one example embodiment, an apparatus for facilitating storage and/or retrieval of unit dose medications is provided. The apparatus may include a processing circuitry configured for receiving an indication that a medication receptacle is positioned proximate to an alignment pin, determining a position of the alignment pin relative to an alignment guide disposed in the medication receptacle, and providing an output indicative of an alignment state of the medication receptacle based on the position determined.

In another exemplary embodiment, a method for facilitating storage and/or retrieval of unit dose medications is provided. The method may include method for receiving an indication that a medication receptacle is positioned proximate to an alignment pin, determining a position of the alignment pin relative to an alignment guide disposed in the medication receptacle, and providing an output indicative of an alignment state of the medication receptacle based on the position determined.

In another exemplary embodiment, a computer program product for facilitating storage and/or retrieval of unit dose medications is provided. The computer program product may include at least one computer-readable storage medium having computer-executable program code instructions stored therein. The computer-executable program code instructions may include program code portions for receiving an indication that a medication receptacle is positioned proximate to an alignment pin, determining a position of the alignment pin relative to an alignment guide disposed in the medication receptacle, and providing an output indicative of an alignment state of the medication receptacle based on the position determined.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5A:
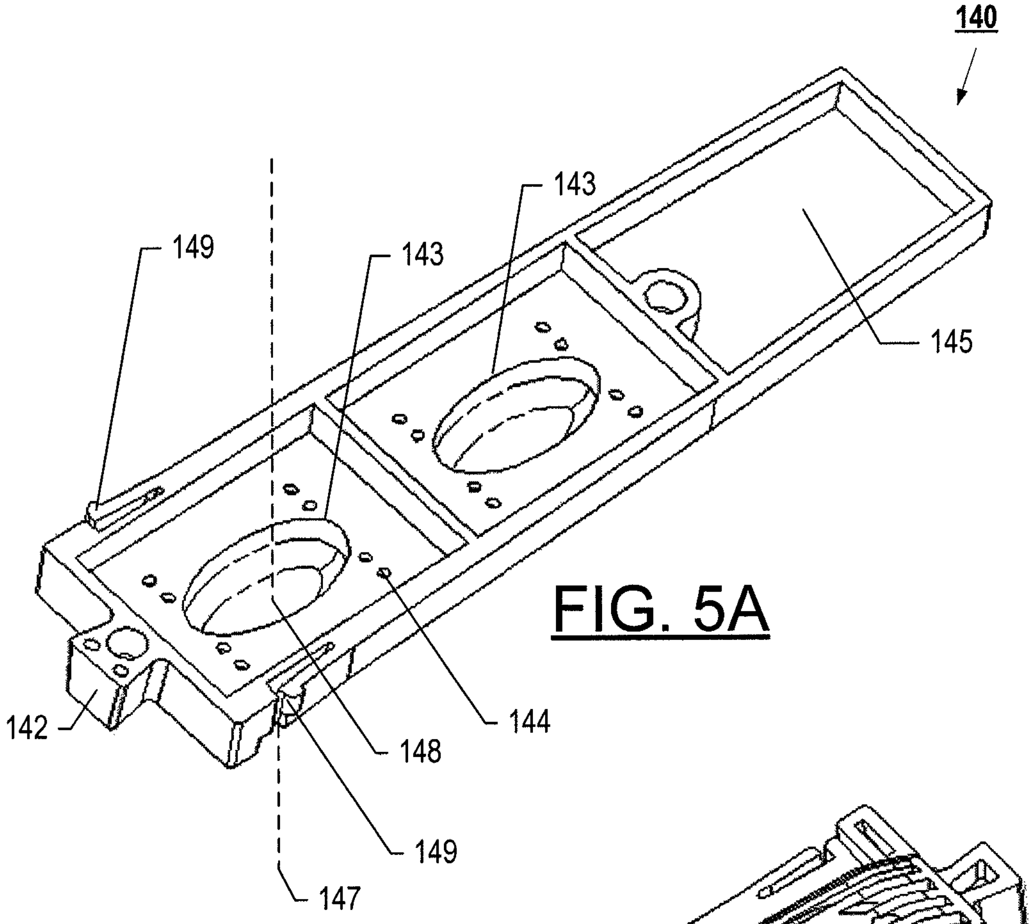
Figure 5B:
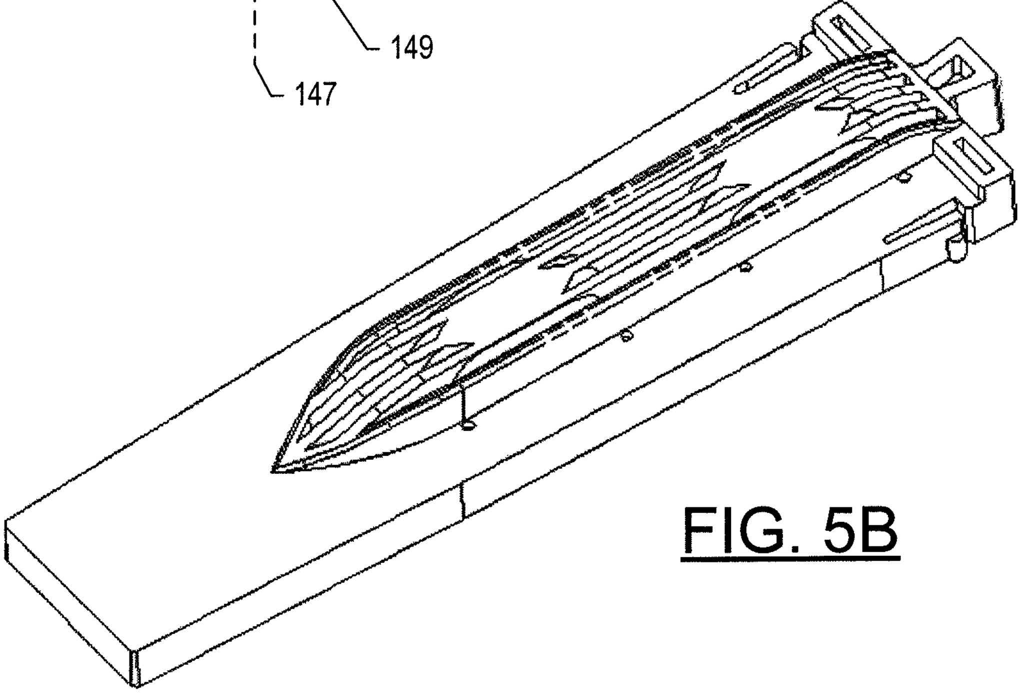
Figure 6A:
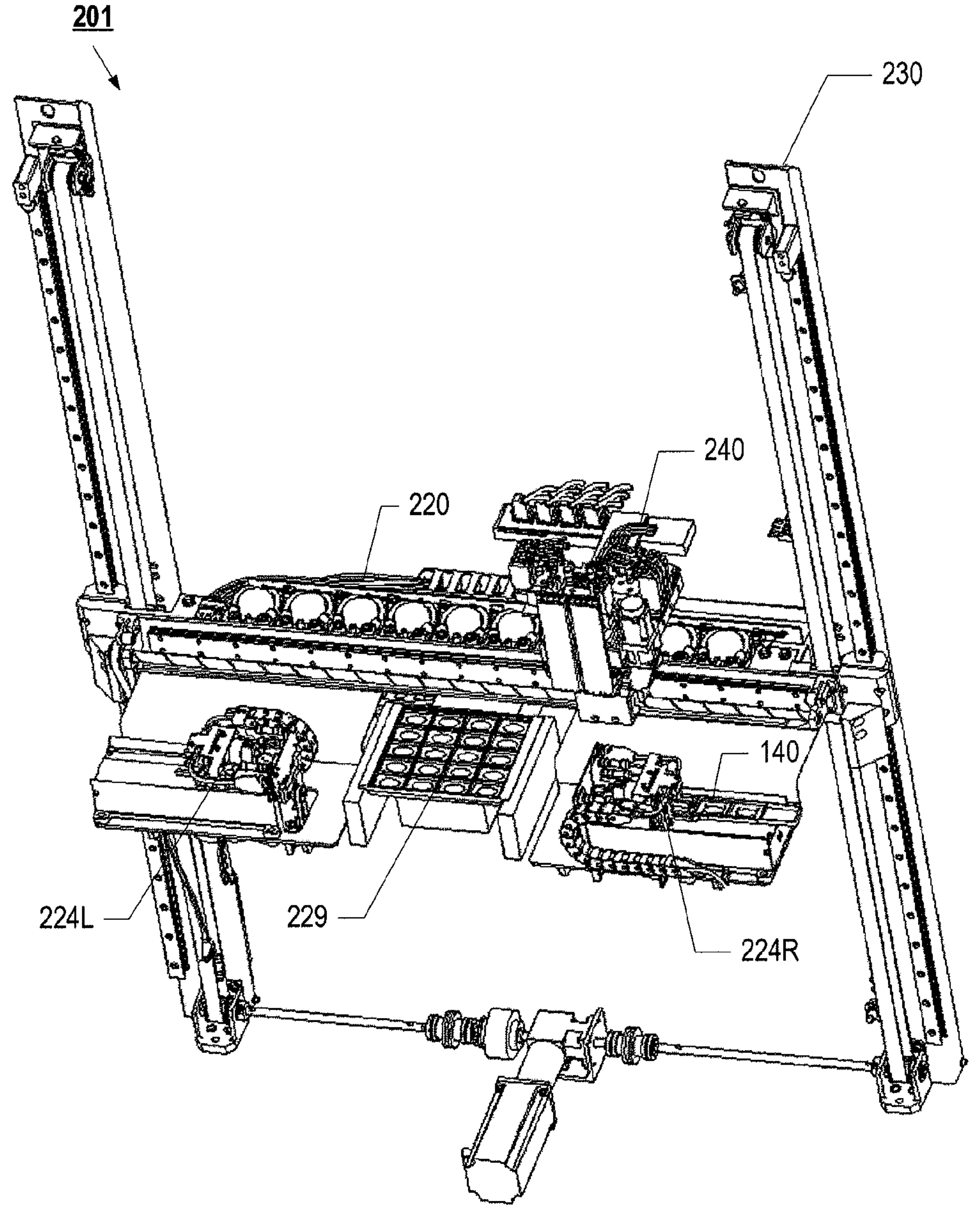
Figure 6B:
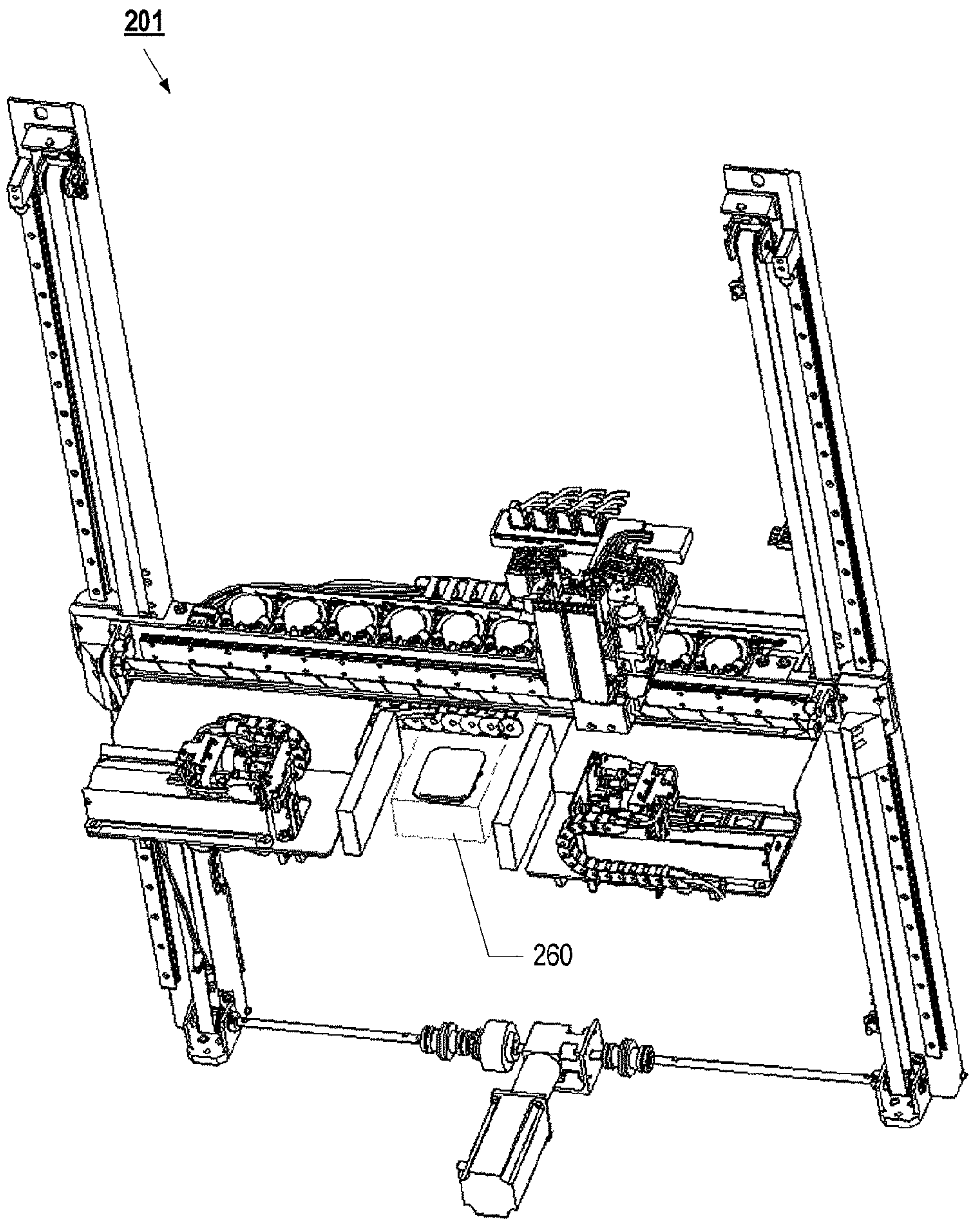
Figure 7:
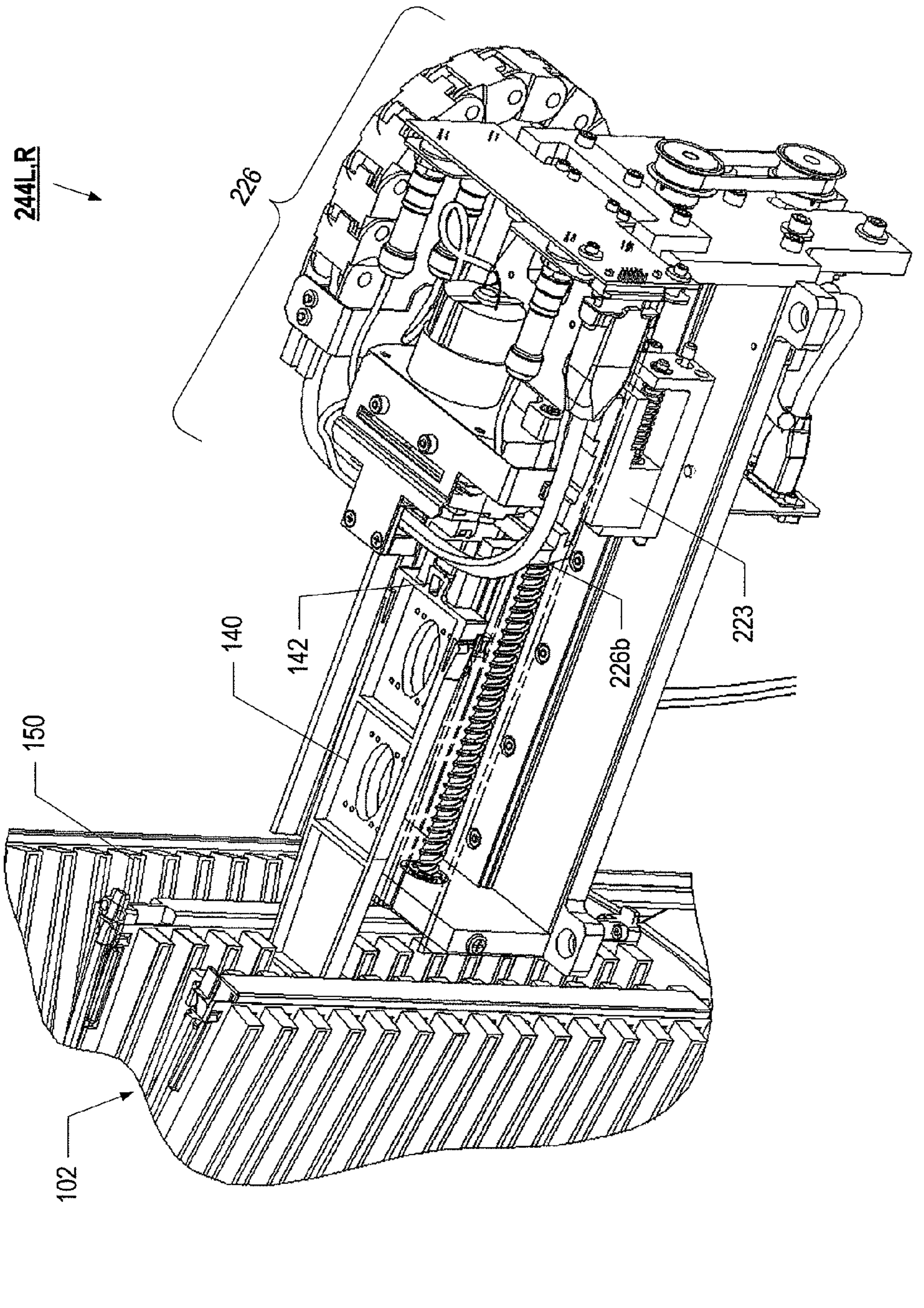
Figure 8:
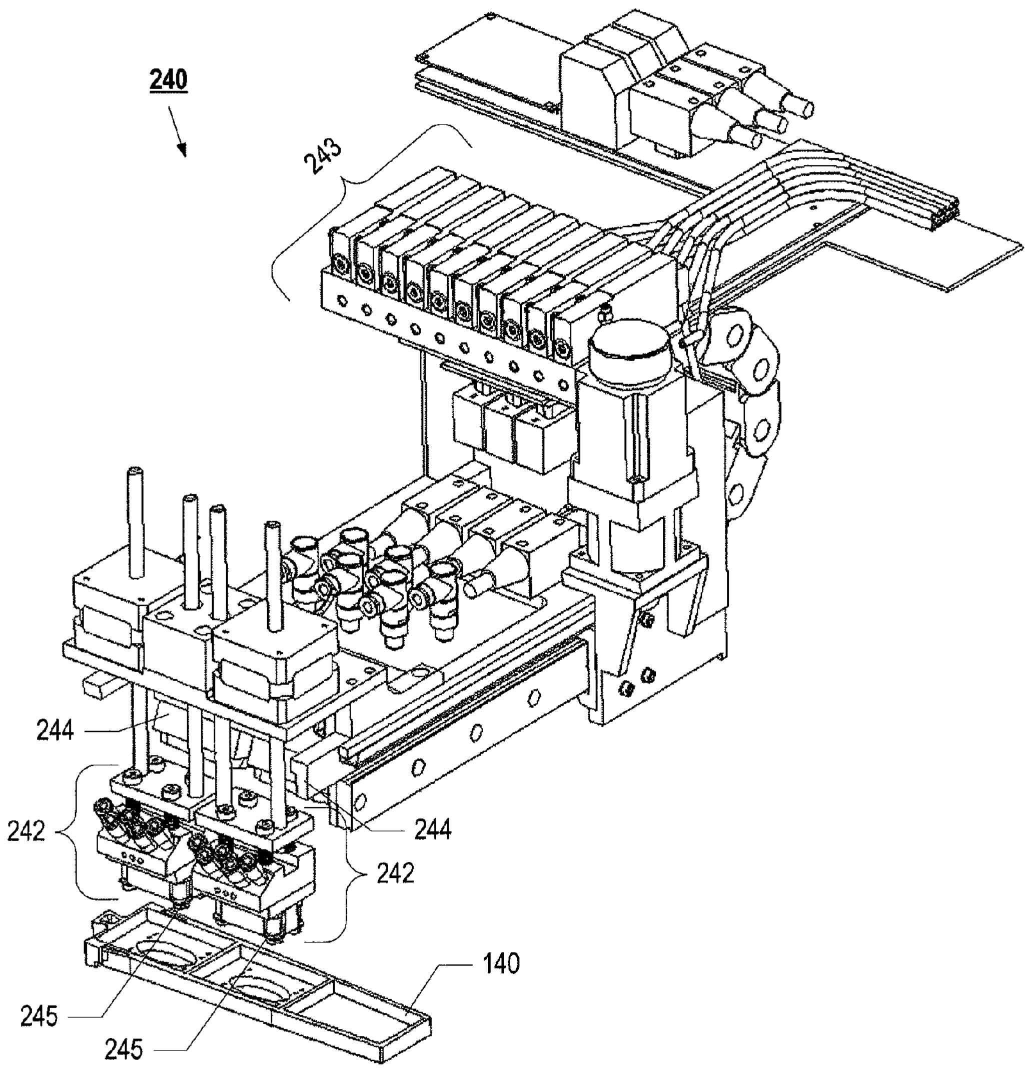
Figure 9:
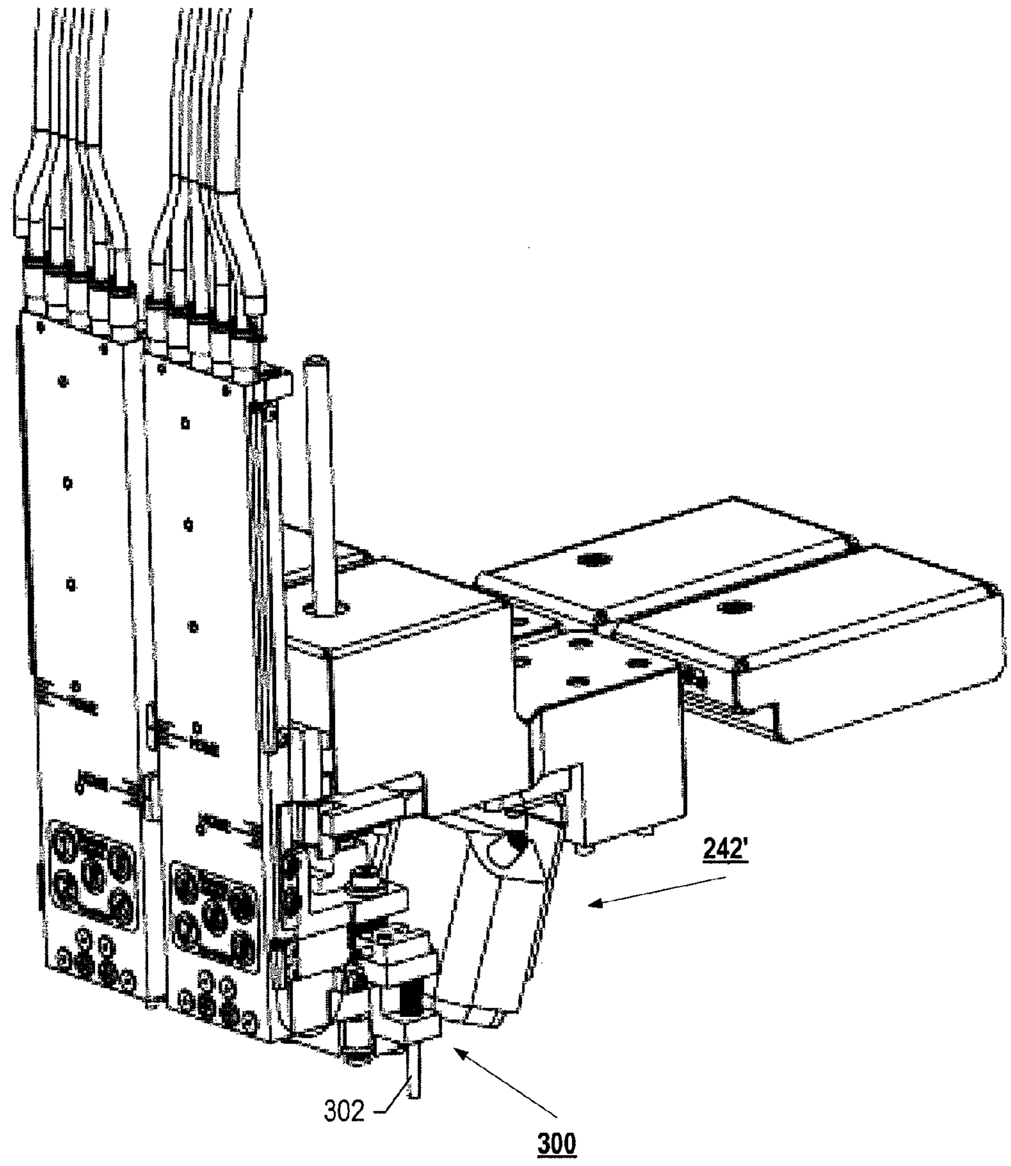
Figure 10:
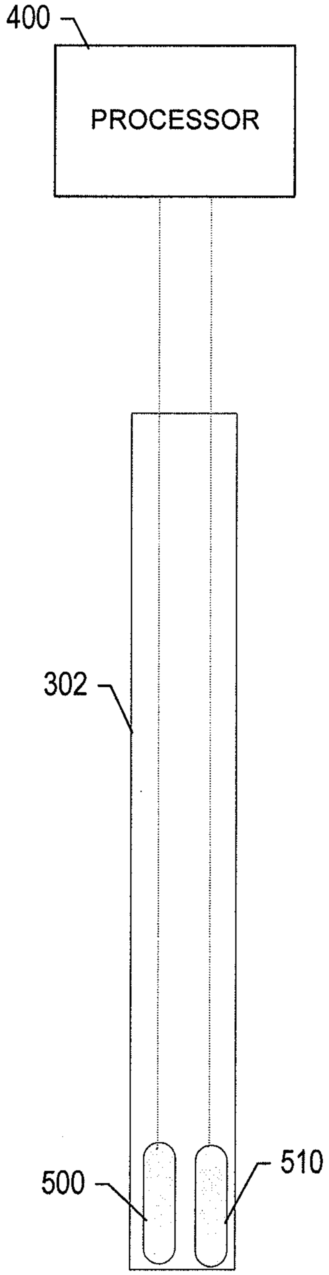
Figure 11:
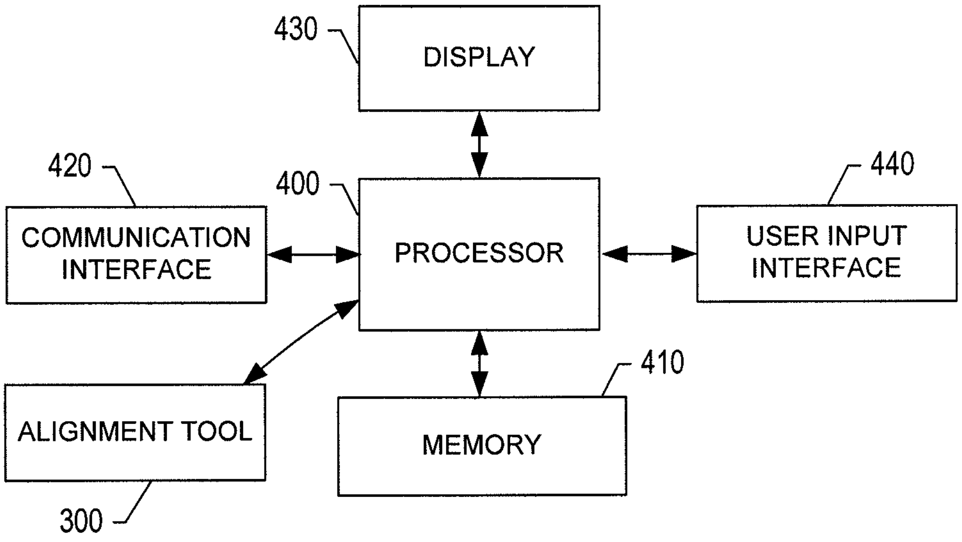
Figure 12:
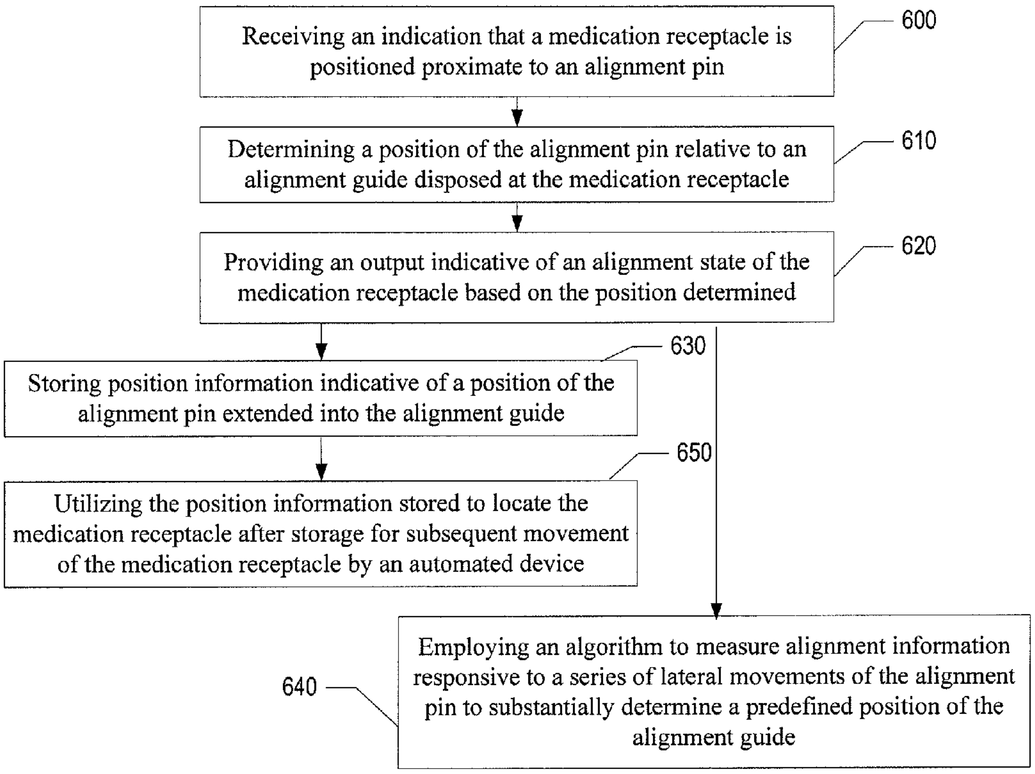

FIG. 5, which includes FIGS. 5A and 5B, illustrates top and bottom perspective views, respectively, of a unit dose blister mount according to an exemplary embodiment of the present invention;

FIG. 6, which includes FIGS. 6A and 6B, illustrates perspective views of a picking system according to an exemplary embodiment of the present invention;

FIG. 7 shows a perspective view of a mount removal mechanism according to an exemplary embodiment of the present invention;

FIG. 8 illustrates a perspective view of a Z axis component according to an exemplary embodiment of the present invention;

FIG. 9 illustrates a perspective view of an alignment tool according to an exemplary embodiment of the present invention;

FIG. 10 illustrates a conceptual block diagram of an alignment pin according to an exemplary embodiment of the present invention;

FIG. 11 illustrates an apparatus for facilitating storage and/or retrieval of unit dose medications according to an exemplary embodiment of the present invention; and FIG. 12 is a flow chart illustrating a method for facilitating storage and/or retrieval of unit dose medications in accordance with an exemplary embodiment of the present invention.

DETAILED DESCRIPTION OF THE INVENTION

Some embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In general, exemplary embodiments of the present invention provide a mechanism by which medication (e.g., in unit dose blisters) may be handled and ultimately dispensed either automatically or with minimal manual assistance. Moreover, embodiments of the present invention may provide a mechanism by which to accurately and reliably determine whether an interruption in medication picking is due to an alignment error or due to missing medication. As such, some example embodiments relate to an alignment detection mechanism that may employ optical or other sensing techniques to determine whether alignment errors exist. Accordingly, embodiments of the present invention may provide a mechanism for automatic handling and dispensing of unit dose packages in a repeatable fashion so that they can be selectively retrieved and delivered, for example by one of the automatic retrieval systems discussed above (e.g., the ROBOT-Rx® system or a robot system able to handle blister dispensing such as that described in U.S. patent application Ser. No. 11/382,605, filed May 10, 2006).

Figure 1:
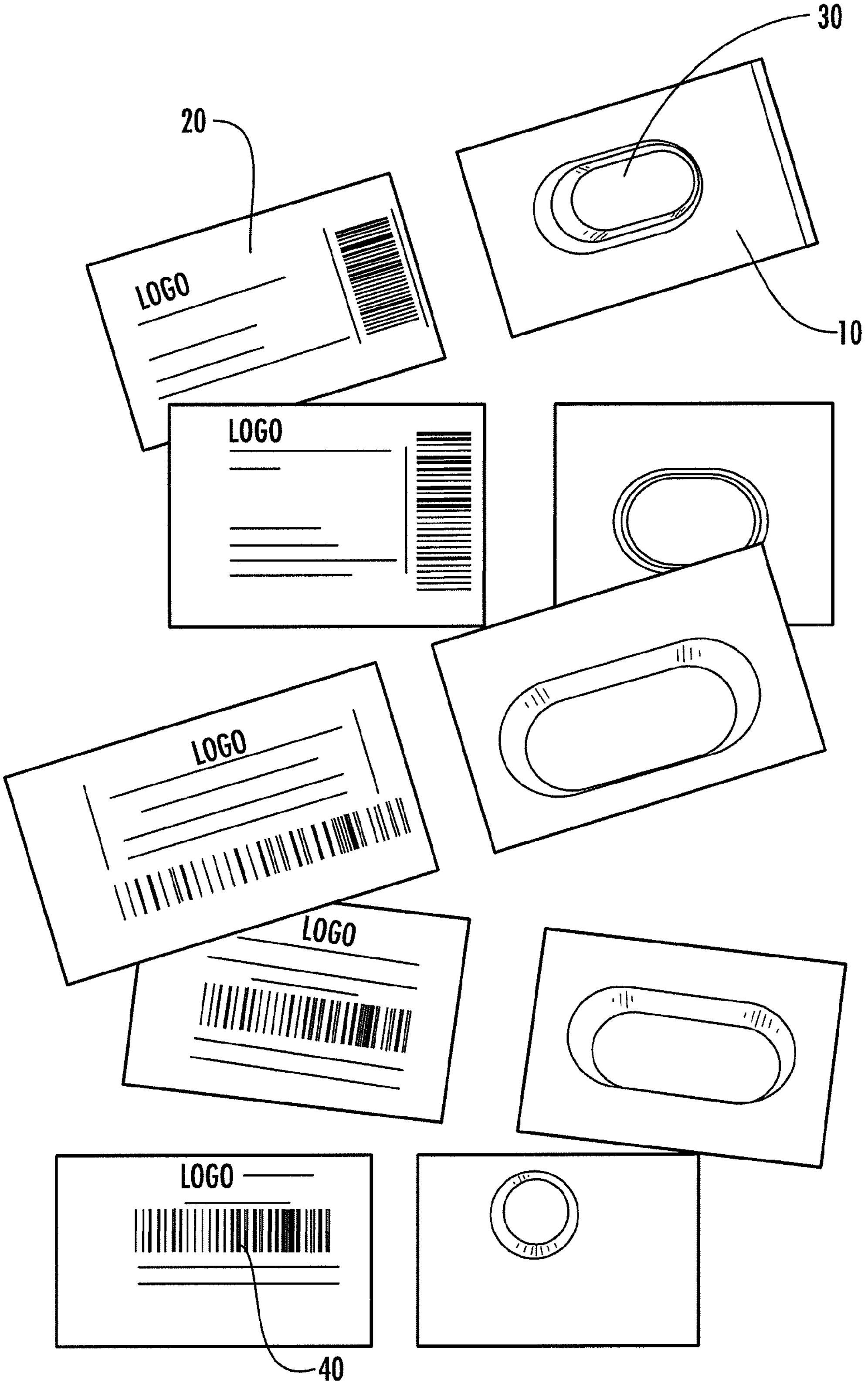
FIG. 1 illustrates several unit dose blisters.

The term "unit dose blister" refers to a unit dose medication, or one or more oral solids of the same or different strength, form or type, that has been sealed in a package, such as a vinyl and foil package in which the vinyl conforms to the shape of the medication. The vinyl is typically sealed to a foil that offers a flat surface with medication information printed on the opposite side from the vinyl cavity. FIG. 1 illustrates several examples of unit dose blisters. As shown, the unit dose blister may include a support panel having opposed first 10 and second 20 sides, wherein the unit dose medication 30 (i.e., the one or more oral solids) is positioned proximate the first side 10 of the support panel, and an identification code 40 (e.g., a barcode, radio frequency identification (RFID) tag, or simple text including any number and combination of alphanumeric characters) including information identifying the unit dose medication 30 is displayed on the second side 20 of the support panel.

When unit dose medications are packaged into a blister, they are typically packaged with several medications per blister card. Thus, there are a corresponding number of equally-spaced vinyl formed cavities per blister card. These cavities are typically separated by a perforation. During formation of a blister card, several manufacturing stations are encountered, but there is no correlation between the handling techniques employed at each station. Accordingly, a blister card that passes through a station for forming a cavity, labeling of the blister, punching of the blister receptacle, punching out of the card, etc., may not be handled in the same manner at each station as the previous or subsequent blister card. Accordingly, inconsistencies may be created between different blister cards. A singulated blister is one that has been separated from a blister card typically along its perforation.

As one of ordinary skill in the art will recognize, while reference is made throughout to unit dose blisters of the form described above, these unit dose blisters provide just one form in which unit dose medications may be packaged. Use of unit dose blisters in the description of exemplary embodiments included herein should not, therefore, be taken as limiting the scope of the present invention to use with such unit dose packages. In contrast, other unit dose packages may similarly be used in connection with exemplary embodiments without departing from the spirit and scope of the present invention.

Figure 2:
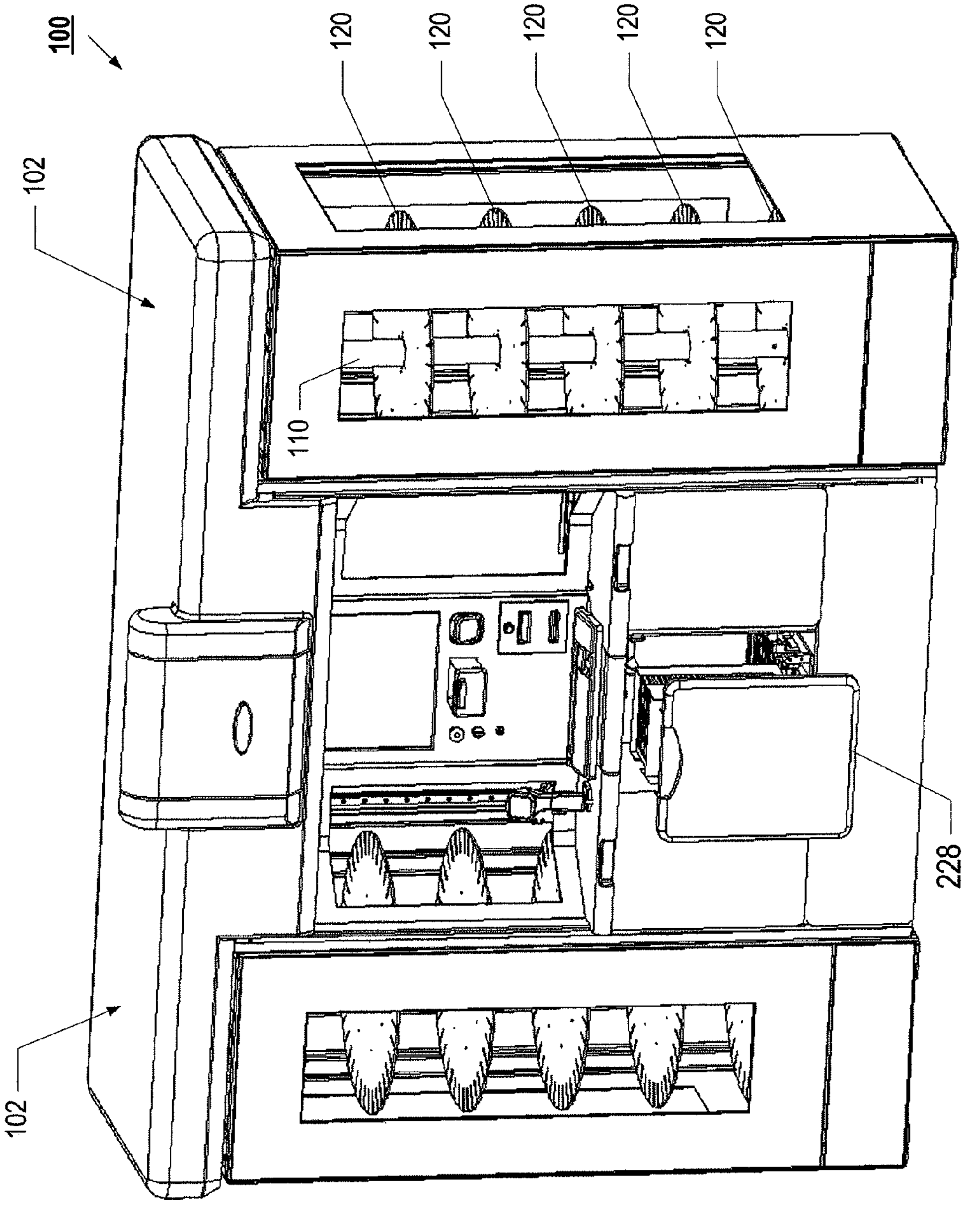
FIGS. 2 and 3 illustrate a storage, retrieval and delivery system in accordance with exemplary embodiments of the present invention.
Figure 3:
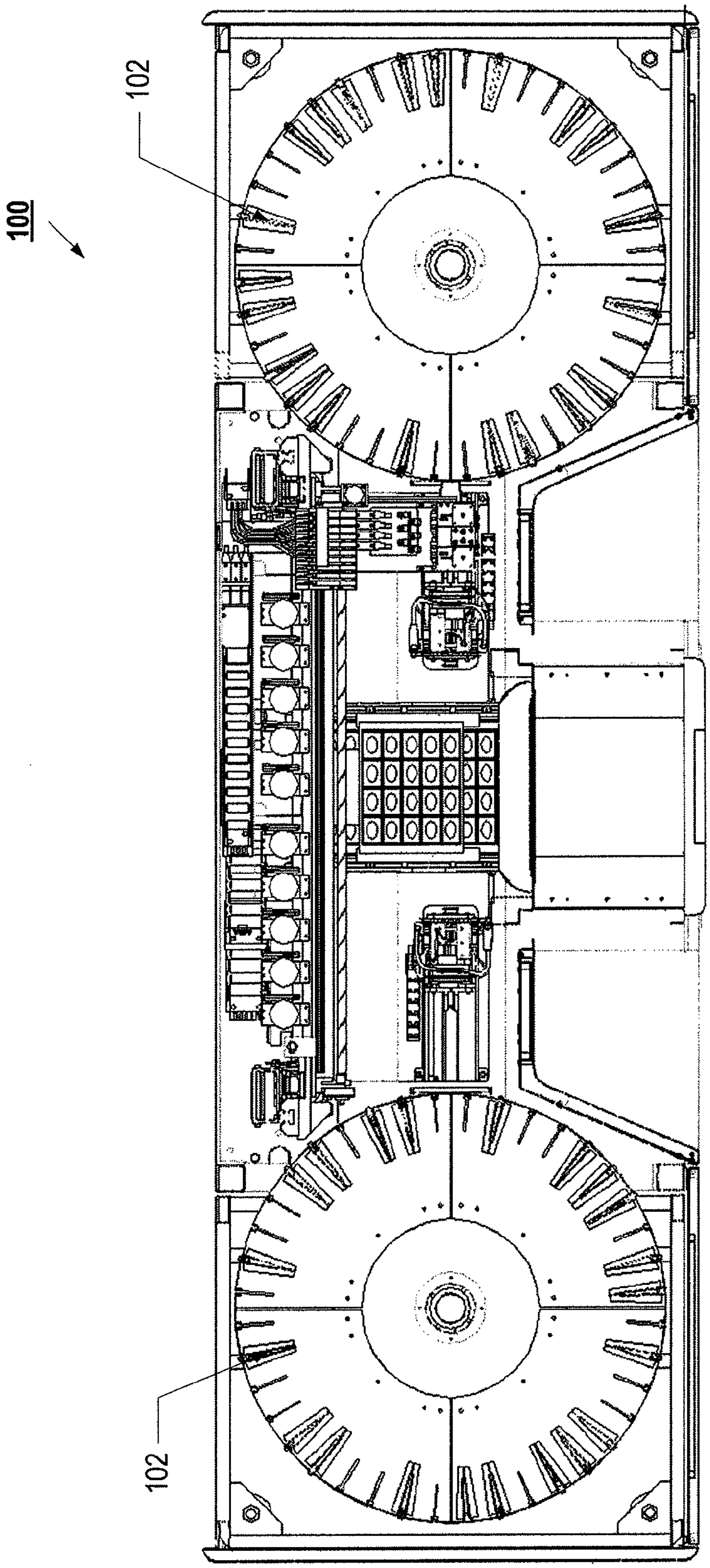

Reference is now made to FIGS. 2 and 3, which illustrate one example of a storage, retrieval and dispensing system 100, in which exemplary embodiments of the present invention may be implemented. As one of ordinary skill in the art will recognize, the system 100 illustrated and described herein is just one manner in which the unit dose packages, or packages containing unit dose medications (e.g., unit dose blisters) may be handled in their natural or raw state (i.e. not over-wrapped or repackaged) in accordance with exemplary embodiments of the present invention. The system 100 of FIGS. 2 and 3 is provided for exemplary purposes only and should not be taken as limiting the scope of the invention in any way, since other systems may likewise be implemented without departing from the spirit and scope of the present invention.

Figure 4:
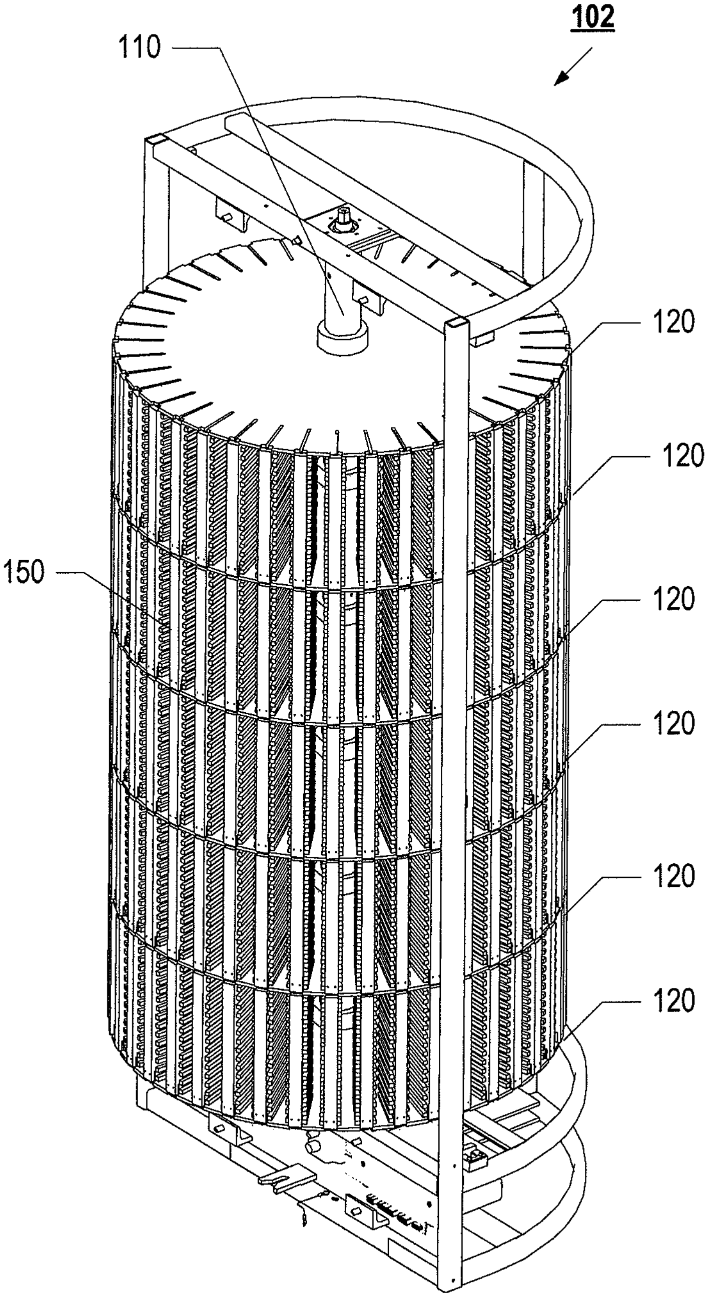
FIG. 4 illustrates a storage system in accordance with exemplary embodiments of the present invention.

The system 100 of exemplary embodiments may include a means for storing a plurality of unit dose blisters of various shapes and sizes, referred to herein as a "storage system" 102. As shown, the storage system 102 of one exemplary embodiment, which is also illustrated in FIG. 4, may be in the form of one or more carousels capable of rotating around a rod or pole 110 extending upward through the center of the carousel. While not shown, the storage system may, alternatively, comprise a linear track that is stationary and essentially resembles a plurality of pigeon holes or mail slots each including a unit dose package mount (e.g., a unit dose blister mount), which is described in detail below. Returning to FIGS. 2 and 3, the rod or pole 110 may be configured to support a plurality of circular panels 120 positioned at some distance from one another, wherein each panel is, in turn, configured to support a plurality of unit dose package mounts (e.g., unit dose blister mounts) (not shown in FIG. 2 or 4), via a plurality of package mount receptacles 150 (e.g., blister mount receptacles—shown in FIG. 4).

In this regard, the blister mount receptacles 150 of one embodiment shown in FIG. 4 extend between adjacent panels 120 so as to define a plurality of wedge-shaped cavities. While the panels 120 could be spaced and the unit dose blister mounts sized such that each wedge-shaped cavity defined by the blister mount receptacles 150 received a single unit dose blister mount, the storage system 102 of the illustrated embodiment is capable of storing a plurality of unit dose blister mounts within each wedge-shaped cavity. In this regard, the blister mount receptacles 150 can include tracks for engaging corresponding grooves or other features defined by the unit dose blister mounts such that multiple unit dose blister mounts can be inserted into a single storage location, e.g., a single wedge-shaped cavity, in an organized manner.

FIG. 5, which includes FIGS. 5A and 5B, illustrates one example of a unit dose blister mount 140, which may be used in order to position a unit dose package (e.g., unit dose blister), in its natural/raw state (i.e., not over-wrapped or repackaged), in a repeatable, predetermined orientation (i.e., in a predetermined plane) so that it can be selectively retrieved and delivered in accordance with exemplary embodiments of the present invention. In particular, the unit dose blister mount 140 of exemplary embodiments is configured to accept a plurality of different types of unit dose blisters of various shapes and sizes. As one of ordinary skill in the art will recognize, the unit dose blister mount 140 illustrated and described herein is just one example of a storage apparatus capable of accepting unit dose packages of various shapes and sizes and should not be taken as limiting the scope of embodiments of the present invention.

As shown in FIGS. 5A and 5B, the unit dose blister mount 140, also referred to herein as a "storage apparatus," of one exemplary embodiment may include a carrier 145 defining one or more cavities 143 therein. Each cavity may be configured to receive the unit dose medication (i.e., the one or more oral solids of the same or different strength, form or type) of a unit dose blister while the support panel of the unit dose blister lies and is maintained in a predetermined plane relative to the carrier. In particular, in one exemplary embodiment, the carrier 145 includes a surface, through which the one or more cavities 143 open. In this embodiment, each cavity 143 may receive the unit dose medication in such a way that the support panel of the unit dose is supported by the surface of the carrier 145 in a plane substantially parallel to the surface of the carrier. In this regard, the unit dose medication is generally disposed within the cavity 143 while the corners or other peripheral portions of the support panel contact and are supported by the carrier 145. In another exemplary embodiment, where the depth of the medication cavity of the unit dose blister is greater than the depth of the cavity 143 defined by the carrier 145, the unit dose medication is in contact with the carrier 145 (i.e., at the floor of the cavity 143), while the support panel is suspended just above the surface of the carrier, but remains in a plane substantially parallel to that surface.

The size, shape and depth of the cavities 143 of one exemplary embodiment may be determined to accommodate a large sampling of unit dose blisters of various shapes and sizes. For example, the cavity 143 may be sized to be large enough to receive at least a majority of the unit dose medications packaged in the unit dose blisters of the large sampling. The cavity 143 may also be sized small enough to prevent the majority of unit dose blisters from falling entirely into the cavity. In one example embodiment shown in FIGS. 5A and 5B, the carrier 145 may be configured to hold two unit dose blisters, wherein each cavity 143 has an elliptical shape with major and minor dimensions of 1.25 inches and 0.625 inches, respectively. FIG. 5A provides a top or overhead perspective of the unit dose blister mount of exemplary embodiments, while FIG. 5B provides the bottom perspective. However, it should be appreciated that unit dose blister mounts, carriers and cavities could each be shaped and sized differently in other example embodiments.

According to exemplary embodiments of the present invention, the unit dose blister is able to naturally sit in the unit dose blister mount 140, or storage apparatus, with its medication cavity down. This orientation may position the unit dose blister to lie substantially flat in a plane defined by the unit dose blister mount 140 (e.g., via the carrier 145), such as the horizontal plane, having its identification code and other printed drug information (i.e., the information displayed on the second side of the support panel of the unit dose blister) viewable from above. Due at least in part to this orientation, the unit dose blister may be scanned and perhaps also picked up relatively easily.

In an example embodiment, the unit dose blister mount 140 may include a handle 142 via which the unit dose blister mount 140 may be grabbed, held, moved or otherwise manipulated. In some embodiments, the handle 142 may include an alignment hole 147 (which is an example of an alignment guide). Additionally or alternatively, instances of the alignment hole 147 may be included at other portions of the unit dose blister mount 140 (e.g., in one or more of the carriers 145). According to some example embodiments, perhaps after reading of a barcode on the unit dose blister, the unit dose blister may be stored in the unit dose blister mount 140 or automatically removed from the unit dose blister mount 140 by a picking system.

FIG. 6, which includes FIGS. 6A and 6B, illustrates a picking system 201 according to an example embodiment. The picking system 201 of one exemplary embodiment may include X-Axis 220, Y-Axis 230 and Z-Axis 240 components configured to enable the picking system 201 to move in three, mutually orthogonal directions, designated X, Y and Z, in order to retrieve a unit dose blister, typically while disposed within a unit dose blister mount 140, from the storage system 102.

The Y-Axis component 230 may comprise one or more timing belts driven by a closed-loop motor and configured to move the X and Z-Axis components 220, 240 in the Y-direction (e.g., up and down). The X-Axis component 220 may, likewise, be driven by a closed-loop motor (e.g., a servo motor) to move linearly in the X-direction (e.g., left and right). In embodiments in which the unit dose blister is disposed within a unit dose blister mount while stored within the storage system 102, the X-Axis component 220 may include one or more cantilevered unit dose package (e.g., blister) mount removal mechanisms 224L, 224R (referred to herein as "mount removal mechanisms"), illustrated in FIG. 7, which are configured to remove a unit dose blister mount 140 from the storage system 102 and present it to a blister removal mechanism 242, which is discussed in further detail below. Where, for example, the storage system 102 of the retrieval and delivery system 100 comprises two carousels, the X-Axis component may include both a left 224L and a right hand 224R mount removal mechanism.

As shown in FIG. 7, the mount removal mechanism 224L, 224R may comprise a gripper 226 capable of gripping the handle 142 of a unit dose blister mount 140. In one exemplary embodiment, the gripper 226 is configured to grip the handle while off center, in other words, despite the fact that the gripper 226 and handle 142 are not completely aligned. The mount removal mechanism 224L, 224R may further include an extension and a retraction mechanism 223 configured to extend the mount removal mechanism 224L, 224R back and forth from the location of the unit dose blister mount 140 to the location where the unit dose blister mount 140 is presented to the blister removal mechanism 242. In other words, the mount removal mechanism 224L, 224R may be configured to move from a first position to a second position proximate the unit dose blister mount 140, to grip the handle 142 of the unit dose blister mount 140, and to then retract away from the second position, in order to present the unit dose blister mount 140 to the blister removal mechanism 242.

The Z-Axis component 240 of the picking system 201, which is shown in more detail in FIG. 8, may comprise one or more unit dose package (e.g., blister) removal mechanisms 242 configured to remove one or more unit dose blisters from a unit dose blister mount 140 when the unit dose blister mount 140 has been presented to the blister removal mechanism 242. The blister removal mechanism 242 may likewise be configured to remove unit dose blisters from restock trays during z restocking process. In one exemplary embodiment, the blister removal mechanism 242 comprises one or more vacuum generators 243 capable of generating a sufficient suction to remove the unit dose blister from the mount 140 or tray 229 (both of which may be examples of medication receptacles), for example using one or more vacuum cups 245, and to hold the unit dose blister until it can be deposited in a specified location, such as a container that is associated with the overall system 260 (shown in FIG. 6B) and from which the unit dose blister may, for example, be dispelled from the back of the system into a patient-specific medication container, or a floor stock container or out a chute in the front of the system, for example, for the purpose of filling a patient first dose (i.e., not as part of a routine fill process).

In one exemplary embodiment, the vacuum generators are capable of generating a local vacuum through the use of one or more diaphragm electric pumps capable of being turned on and off. In particular, rather than requiring the use of compressed air, which can be costly, inefficient and fairly disruptive in terms of the noise and required piping associated with the use of an air compressor, the system of exemplary embodiments of the present invention uses one or more electric vacuum generators to produce a local vacuum, thus eliminating the need for compressed air and enabling the storage, retrieval and delivery system to essentially be moved into a facility and plugged into an electric power outlet in the wall. It should be appreciated that although a vacuum based removal mechanism has been described above, other mechanisms for removing unit dose blisters could alternatively be employed.

In some embodiments, the dispensing system 100 may further include one or more readers 244, including, for example, barcode or radio frequency identification (RFID) tag readers, cameras, or the like, capable of reading the identification code 40 displayed on the unit dose blister located in the unit dose blister mount 140 and communicating the information obtained (e.g., the identity of the unit dose medication, or one or more oral solids, held by the unit dose blister) to a controller associated with the storage, retrieval and delivery system 100, for the purpose of verifying that the correct medication has been selected. As shown in FIG. 8, the one or more code readers 244 can be carried by the Z-Axis component 240. Using the card reader 244 to employ a scanning technique, the picking system 201 of a storage, retrieval and delivery system 100 may be enabled to reliably read the barcode, or similar identification code, on the medication without having to reorient the medication in any way. In addition, this position and containment offers a consistent, reliable means for the picking system 201 to vacuum pick (e.g., using the blister removal mechanism 242) the unit dose blister during the retrieval and delivery process.

In some embodiments, if the blister removal mechanism 242 fails to remove medication from the unit dose blister mount 140 during operation, a fault may be sensed. The fault may generally have occurred due to any of a number of reasons. For example, the unit dose blister mount 140 may not be properly aligned to permit the blister removal mechanism 242 to remove the medication (e.g., the unit dose blister) or there may actually not be any medication in the carrier 145 or the cavity 143. An exemplary embodiment of the present invention may provide a solution for determining the reason for failure remove the medication and/or assist in the prevention of failures that may otherwise occur due to improper alignment or positioning of the unit dose blister mount 140.

In this regard, an exemplary embodiment of the present invention may employ an alignment tool 300. The alignment tool 300, an example of which is shown in FIG. 9, may include an alignment pin 302 that may be configured to interact with the alignment hole 147 of the unit dose blister mount 140. In this regard, when the unit dose blister mount 140 is presented to the blister removal mechanism 242, the alignment tool 300 may be employed to determine whether the unit dose blister mount 140 is properly aligned in connection with the removal of medication from the unit dose blister mount 140. In one embodiment, the alignment tool 300 may determine proper alignment of the unit dose blister mount 140 prior to initiation of attempts to remove medication. In such cases, an indication from the alignment tool 300 of proper alignment may enable continued operation of the blister removal mechanism 242 for medication removal. In an alternative case, the alignment tool 300 may determine proper alignment of the unit dose blister mount 140 during the removal process such that the operation of the alignment tool 300 may not substantially delay operation of the blister removal mechanism 242. In still another alternative, the alignment tool 300 may determine proper alignment of the unit dose blister mount 140 in response to a failure to remove medication from the unit dose blister mount 140. In such cases, the verification of proper alignment may be useful in determining a cause for the failure.

As indicated in FIG. 9, the alignment tool 300 may be positioned on a blister robot end-of-arm-tool (EOAT). As such, for example, the alignment pin 302 may be positioned at a bottom portion of blister removal mechanism 242'. The alignment pin 302 of some example embodiments may be positioned to align with the alignment hole 147 of a unit dose blister mount that is properly positioned to allow medication removal. Although the alignment pin 302 may be extendible and/or retractable, in some embodiments, the alignment pin 302 may generate an electrical, optical or other readable signal that may be enabled to pass unobstructed through the alignment hole 147 of a properly aligned unit dose blister mount. If there is obstruction of the signal, the alignment tool 300 may determine that the alignment hole 147 is not properly aligned with respect to the alignment pin 302 due to the unit dose blister mount 140 not being properly positioned to permit removal of the medication. As such, the alignment pin 302 may be enabled to determine whether the blister removal mechanism 242 (e.g., a pick head of the blister removal mechanism 242) is properly aligned to permit medication removal based on whether the alignment pin 302 hits the unit dose blister mount 140 or whether a received signal generated from the alignment pin 302 is indicative of physical obstruction. In the example described above, a sensor may be positioned on an opposite side of the unit dose blister mount 140 with respect to a signal emitter or transmitter collocated with the alignment pin 302. However, in an alternative embodiment, an example of which is shown in FIG. 10, the alignment pin may include a signal emitter 500 configured to emit a signal toward the alignment hole 147 and a sensor 510 configured to receive signal reflections that may occur due to the signal reflecting off a top or bottom surface of the unit dose blister mount 140 (or a tray) due to misalignment.

In an example embodiment, the alignment tool 300 may include or otherwise operate under the control of processing circuitry. Moreover, in some embodiments the processing circuitry of FIG. 11 may also control the storage, retrieval and delivery system 100 of exemplary embodiments of the present invention. As such, the system 100 may further comprise a processor, controller, or similar processing device, capable of directing operation of the alignment tool 300 and perhaps also other portions of the system 100 including, for example, the blister removal mechanism 242 and/or the picking system 201.

An exemplary embodiment will now be described referring to FIG. 11, which is a block diagram of a controller, or similar processing device, capable of operating in accordance with an exemplary embodiment of the present invention. As shown, the processing circuitry may include various means for performing one or more functions in accordance with exemplary embodiments of the present invention, including those more particularly shown and described herein. It should be understood, however, that the processing circuitry, which may include a controller, or similar processing device, may include alternative means for performing one or more like functions, without departing from the spirit and scope of the present invention. As shown, the processing circuitry may include a processor 400 connected to a memory 410. In addition to the memory 410, the processor 400 may also be connected to at least one interface or other means for displaying, transmitting and/or receiving data, content or the like. In this regard, the interface(s) can include at least one communication interface 420 or other means for transmitting and/or receiving data, content or the like, as well as at least one user interface that may include a display 430 and/or a user input interface 440. The user input interface 440, in turn, may comprise any of a number of devices allowing the controller to receive data from a user, such as a keypad, a touch display, a joystick, a foot pedal, actuator, button or other input device. However, in some embodiments, the display 430, user input interface 440 and/or the communication interface 420 may be omitted.

The processor 400 may be embodied as various processing means such as a processing element, a coprocessor, a controller or various other processing devices including integrated circuits such as, for example, an ASIC (application specific integrated circuit), an FPGA (field programmable gate array), a PLC (programmable logic controller), a hardware accelerator, or the like. The processor 400 may be configured (e.g., via hardcoded instructions or via execution of software instructions) to perform or control the various functions of the processing circuitry. The memory 410 may include volatile and/or non-volatile memory, and typically stores content, data or the like. For example, the memory 410 may be non-transitory memory capable of storing content transmitted from, and/or received by, the processing circuitry. Also for example, the memory 410 may store software applications, instructions or the like for enabling the processor 400 to perform steps associated with operation of the processing circuitry in accordance with embodiments of the present invention. In one exemplary embodiment, the memory 410 stores instructions for directing the processor 400 to control the alignment tool 300 in relation to operations described herein.

In operation, the unit dose blister mount 140 may be presented to the blister removal mechanism 242 (e.g., under direction provided by the processor 400) and the alignment tool 300 (e.g., under direction provided by the processor 400) may control transmission of the signal from the alignment pin 302. Responsive to detection of at least a portion of the signal at the opposite side of the alignment hole 147 from which the side from which the signal is transmitted (or from the same side if a reflected signal is measured instead of measuring a degree of transmissivity presented through the alignment hole 147), the alignment tool 300 may determine an alignment state of the unit dose blister mount 140. In some embodiments, an output regarding the alignment state may be provided to the user (e.g., via the display 430 or audibly). However, regardless of whether the user is informed, an output regarding the alignment of the alignment pin 302 with the alignment hole 147 may be generated, for example, for feedback for use in better alignment or for storing location information as described below.

In some embodiments, the alignment tool 300 may further operate (e.g., under control by the processor 400 and based on instructions and location information stored in the memory 410) to learn proper pick and place locations for a plurality (or perhaps each) of the storage locations that are accessible to the robot. As an example, a technician may manually move the EOAT toward a unit dose blister mount or tray that is being held by the robot and the alignment pin 302 may be aligned with the alignment hole 147 of the unit dose blister mount or tray (e.g., by placing the alignment pin 302 into the alignment hole 147). The position (e.g., in terms of X, Y and Z coordinates) corresponding to this alignment may be recorded (e.g., in the memory 410). From this initial recorded position, the robot may be configured to use the alignment pin 302 to detect a top surface of the unit dose blister mount in order to determine the proper pick and place height for the unit dose blister mount based on known offsets from the top surface of the unit dose blister mount. Thereafter, the robot may be configured to detect edges of the alignment hole 147 by making small lateral movements in the plane of the top surface of the unit dose blister mount in which one or more lateral movements may be followed by a corresponding vertical movement attempting to seat the alignment pin within the alignment hole 147 and thereby learn the best location for picking the unit dose blister mount. A boundary between the alignment hole and the top surface of the unit dose blister mount may be detected by the state of the alignment pin signal. Accordingly, for example, the processor 400 may execute an alignment algorithm to find (at least approximately) edges and perhaps also a center of the alignment hole 147, which may be recorded so that the picking system 201 may be enabled to thereafter select the correct location and height at which to grab the unit dose blister mount based on stored location information generated responsive to alignment of the alignment pin 302 relative to the alignment hole 147. Accordingly, some embodiments of the present invention may provide an ability to self align the alignment tool 300 to pre-stored unit dose blister mount (or other medication receptacle) locations based on feedback signals received regarding alignment of the alignment pin 302 relative to the alignment hole 147.

Accordingly, embodiments of the present invention may provide a mechanism for use in measuring alignment information for medication receptacles. As such, some embodiments may provide alignment detection functions with respect to a device used to pick medications during automated medication handling and dispensing. In this regard, for example, some example embodiments may provide enablement for determining a cause for an alignment failure encountered during handling and/or for automatically learning storage locations to facilitate robotic operation with respect to handling medications.

FIG. 12 is a flowchart of a method and program product according to exemplary embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device and executed by a processor (e.g., processor 400). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

In this regard, a method of receiving an indication that a medication receptacle (e.g., unit dose blister mount 140 or tray 229) is positioned proximate to an alignment pin at operation 600, determining a position of the alignment pin relative to an alignment guide (e.g., alignment hole 147) disposed at the medication receptacle at operation 610, and providing an output indicative of an alignment state of the medication receptacle based on the position determined at operation 620.

In some embodiments, optional operations may be provided in addition to the operations described above. It should be appreciated that each of the optional operations described below may be included with the operations above either alone or in combination with any others among the features described herein. Accordingly, in some embodiments, the method may further include storing position information indicative of a position of the alignment pin extended into the alignment guide at operation 630 and/or employing an algorithm to measure alignment information responsive to a series of lateral movements of the alignment pin to substantially determine a predetermined position (e.g., a center) of the alignment guide at operation 640. In some embodiments, the method may further include utilizing the position information stored to locate the medication receptacle after storage for subsequent movement of the medication receptacle by an automated device at operation 650.

In some embodiments, the operations described above may be modified. The modifications may be included in any combination and in any order. As such, in some cases, determining the position of the alignment pin may include transmitting a signal from the alignment pin toward the alignment guide and measuring the signal to determine the position based on a result of the measuring. In some cases, transmitting the signal may include transmitting an electrical signal or an optical signal. In some cases, determining the position of the alignment pin may include extending the alignment pin into the alignment guide.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method comprising:

receiving an indication that a medication receptacle is positioned proximate to an alignment pin;

determining a position of the alignment pin relative to an alignment guide disposed at the medication receptacle; and providing an output indicative of an alignment state of the medication receptacle based on the position determined.

2. The method of claim 1, wherein determining the position of the alignment pin comprises transmitting a signal from the alignment pin toward the alignment guide and measuring at least a portion of the signal to determine the position based on a result of the measuring.

3. The method of claim 2, wherein transmitting the signal comprises transmitting an electrical signal or an optical signal.

4. The method of claim 1, wherein determining the position of the alignment pin comprises extending the alignment pin into the alignment guide.

5. The method of claim 4, further comprising storing position information indicative of a position of the alignment pin extended into the alignment guide.

6. The method of claim 5, further comprising utilizing the position information stored to locate the medication receptacle after storage for subsequent movement of the medication receptacle by an automated device.

7. The method of claim 4, further comprising employing an algorithm to measure alignment information responsive to a series of lateral movements of the alignment pin followed by corresponding vertical movement of the alignment pin to attempt to seat the alignment pin within the alignment guide to substantially determine a predefined position of the alignment guide.

8. A computer program product comprising at least one computer-readable storage medium having computer-executable program code instructions stored therein, the computer-executable program code instructions comprising:

program code instructions for receiving an indication that a medication receptacle is positioned proximate to an alignment pin;

program code instructions for determining a position of the alignment pin relative to an alignment guide disposed in the medication receptacle; and program code instructions for providing an output indicative of an alignment state of the medication receptacle based on the position determined.

9. The computer program product of claim 8, wherein program code instructions for determining the position of the alignment pin include instructions for transmitting a signal from the alignment pin toward the alignment guide and measuring at least a portion of the signal to determine the position based on a result of the measuring.

10. The computer program product of claim 9, wherein program code instructions for transmitting the signal include instructions for transmitting an electrical signal or an optical signal.

11. The computer program product of claim 8, wherein program code instructions for determining the position of the alignment pin include instructions for extending the alignment pin into the alignment guide.

12. The computer program product of claim 11, further comprising program code instructions for storing position information indicative of a position of the alignment pin extended into the alignment guide.

13. The computer program product of claim 12, further comprising program code instructions for utilizing the position information stored to locate the medication receptacle after storage for subsequent movement of the medication receptacle by an automated device.

14. The computer program product of claim 11, further comprising program code instructions for employing an algorithm to measure alignment information responsive to a series of lateral movements of the alignment pin followed by corresponding vertical movement of the alignment pin to attempt to seat the alignment pin within the alignment guide to substantially determine a predefined position of the alignment guide.

15. An apparatus comprising processing circuitry configured to:
- receive an indication that a medication receptacle is positioned proximate to an alignment pin;
- determine a position of the alignment pin relative to an alignment guide disposed in the medication receptacle; and
- provide an output indicative of an alignment state of the medication receptacle based on the position determined.

16. The apparatus of claim 15, wherein the processing circuitry is configured to determine the position of the alignment pin by transmitting a signal from the alignment pin toward the alignment guide and measuring at least a portion of the signal to determine the position based on a result of the measuring.

17. The apparatus of claim 16, wherein the processing circuitry is configured to transmit the signal including transmitting an electrical signal or an optical signal.

18. The apparatus of claim 15, wherein the processing circuitry is configured to determine the position of the alignment pin by extending the alignment pin into the alignment guide.

19. The apparatus of claim 18, wherein the processing circuitry is further configured to store position information indicative of a position of the alignment pin extended into the alignment guide.

20. The apparatus of claim 19, wherein the processing circuitry is further configured to utilize the position information stored to locate the medication receptacle after storage for subsequent movement of the medication receptacle by an automated device.

21. The apparatus of claim 18, wherein the processing circuitry is further configured to employ an algorithm to measure alignment information responsive to a series of lateral movements of the alignment pin followed by corresponding vertical movement of the alignment pin to attempt to seat the alignment pin within the alignment guide to substantially determine a predefined position of the alignment guide.

22. The apparatus of claim 15, further comprising:
- a signal emitter disposed at the alignment pin to transmit a signal toward the alignment guide; and
- a signal receiver configured to receive at least a portion of the signal transmitted by the signal emitter to determine the position of the alignment pin relative to the alignment guide based on the portion of the signal received.

23. The apparatus of claim 22, wherein the signal receiver is disposed at the alignment pin and is in communication with the processing circuitry, the signal receiver being configured to receive reflected portions of the signal.

24. The apparatus of claim 22, wherein the signal receiver is disposed at an opposite side of the alignment guide with respect to the alignment pin and is in communication with the processing circuitry, the signal receiver being configured to receive portions of the signal that pass through the alignment guide.

* * * * *